(12) United States Patent
Hessel et al.

(10) Patent No.: US 11,794,944 B2
(45) Date of Patent: Oct. 24, 2023

(54) VISIBILITY PACKAGING FOR ENERGY STORAGE ELEMENTS

(71) Applicants: VARTA Microbattery GmbH, Ellwangen Jagst (DE); VARTA Consumer Batteries GmbH & Co. KGaA, Ellwangen Jagst (DE)

(72) Inventors: Otto Hessel, Ellwangen (DE); Dietmar Köhnlein, Ellwangen (DE); Werner Regner, Fichtenau (DE)

(73) Assignees: VARTA Microbattery GmbH, Ellwangen Jagst (DE); VARTA Consumer Batteries GmbH & Co. KGaA, Ellwangen Jagst (DE)

( * ) Notice: Subject to any disclaimer, the term of this patent is extended or adjusted under 35 U.S.C. 154(b) by 111 days.

(21) Appl. No.: 17/366,149

(22) Filed: Jul. 2, 2021

(65) Prior Publication Data
US 2022/0002023 A1    Jan. 6, 2022

(30) Foreign Application Priority Data

Jul. 2, 2020    (EP) .................................... 20183715

(51) Int. Cl.
B65D 5/42     (2006.01)
B65D 5/16     (2006.01)
B65D 5/02     (2006.01)

(52) U.S. Cl.
CPC ......... B65D 5/4204 (2013.01); B65D 5/0227 (2013.01); B65D 5/16 (2013.01);
(Continued)

(58) Field of Classification Search
CPC ...... B65D 5/4204; B65D 5/0227; B65D 5/16; B65D 5/4208; B65D 5/4266;
(Continued)

(56) References Cited

U.S. PATENT DOCUMENTS 4,696,402 A    9/1987  Harmon et al.
5,428,940 A *  7/1995  Paumen ................. B65D 71/38
                                                      53/452

(Continued)

FOREIGN PATENT DOCUMENTS

BR    8601193 A    11/1986
CN    1680173 A    10/2005
(Continued)

OTHER PUBLICATIONS

First Office Action dated Aug.t 17 , 2022, of countegpart Chinese Patent Application No. 202110748943.2, along with an English translation.

Primary Examiner — Andrew D Perreault
(74) Attorney, Agent, or Firm — DLA Piper LLP (US)

(57) ABSTRACT

Visibility packaging for energy storage elements includes a front wall spaced apart from a rear wall and provided with at least one viewing cutout and at least one web having a central apex region fixed to a contact region of the rear wall, wherein the web and the rear wall together form a K-shaped cross section in a closure position and the web closes a removal opening of a receiving space, and the rear wall has at least one perforation that delimits a contact region from a remainder of the rear wall and makes it possible to separate the contact region from the rear wall such that the web can be transferred by a folding operation into a removal position in which the apex region of the web is spaced apart from the rear wall and the web frees the removal opening of the receiving space.

10 Claims, 9 Drawing Sheets

(52) U.S. Cl.
CPC ......... *B65D 5/4208* (2013.01); *B65D 5/4266* (2013.01); *B65D 2585/88* (2013.01)

(58) Field of Classification Search
CPC .. B65D 2585/88; B65D 5/04; B65D 73/0085; B65D 5/54; B65D 5/542; B65D 75/367; B65D 75/566; B65D 75/58
See application file for complete search history.

(56) References Cited

U.S. PATENT DOCUMENTS

| | | | | |
|---|---|---|---|---|
| 5,544,755 | A | * | 8/1996 | Paumen ................. B65D 71/16 206/485 |
| 5,947,297 | A | | 9/1999 | Aoki et al. |
| 6,427,841 | B2 | * | 8/2002 | Wani ..................... B65D 75/36 206/806 |
| 2005/0262809 | A1 | | 12/2005 | Tada et al. |
| 2020/0115125 | A1 | | 4/2020 | Simpkins |

FOREIGN PATENT DOCUMENTS

| | | |
|---|---|---|
| CN | 200946019 Y | 9/2007 |
| CN | 102815456 A | 12/2012 |
| DE | 4121566 A1 | 1/1993 |
| DE | 41 35 468 A1 | 4/1993 |
| EP | 0 195 426 A2 | 9/1986 |
| EP | 0 466 328 A2 | 1/1992 |
| EP | 1 671 896 A1 | 6/2006 |
| JP | H11-124168 A | 5/1999 |

* cited by examiner

VISIBILITY PACKAGING FOR ENERGY STORAGE ELEMENTS

TECHNICAL FIELD

This disclosure relates to a visibility packaging for energy storage elements and a blank for production of such a visibility packaging.

BACKGROUND

Energy storage elements are often mass-produced articles that are commercially available in retail and storage packs. The packaging themselves should, on the one hand, be economical and, on the other hand, have an appealing appearance to be able to provide incentives to buy. In this context, packaging of the blister card type, which is generally formed by a cardboard card and a transparent blister film composed of plastic, are widely used, wherein the blister film makes it possible to see the energy storage elements.

EP 1 671 896 A1 describes, for example, a blister pack for energy storage elements. The blister forms a plurality of individual compartments. The back blister card is, for example, formed from cardboard. The rear blister card is broken through as a result of the user pressing through the blister onto the energy storage elements such that the energy storage elements can be removed. Variants of this kind in which individual energy storage elements are pressed out through the packaging are also referred to as single press out technology. A single energy storage element is generally pressed out of an individual space.

However, such packaging of the blister card type are not without problems in terms of disposal since in particular the film portions of the packaging are rarely recyclable and are generally poorly degradable. With the goal of providing a more disposal-friendly sales packaging, the sales packaging in DE 41 35 468 A1 is based exclusively on two cardboard blanks that form a carrier part with doubled side walls for receiving the energy storage elements and an adapted envelope with a viewing window. Packaging of this kind has the advantage that the packaging is fully recyclable and thus very environmentally friendly. In addition, individual energy storage elements can be removed, and then the pack can be closed again, by pulling the carrier out of the envelope and pushing it back in again. This operation is however relatively awkward for the user.

Another type of packaging is disclosed in EP 0 466 328 A2. That packaging, which is provided in particular for energy storage elements in the form of cylindrical round cells, is formed from the blank of a sheet composed of a durable stiff material, in particular composed of cardboard, wherein a channel region of V-shaped cross section is formed. Openings are provided in the blank which are positioned such that they are arranged in opposite integral oblique limbs of the channel region, whereas the limbs are present in a V arrangement. The cylindrical round cells are inserted into the openings of the channel such that the round cells are retained by the limbs, and rotation of the cylindrical round cells is prevented. To be able to remove one or more round cells from this packaging, the packaging has to be torn open.

It could therefore be helpful to provide an improved packaging for energy storage elements, the packaging being able to be disposed of in a more environmentally friendly manner, and to offer a practical solution for the removal and, at the same time, for the stocking of the energy storage elements, in particular, recloseability.

SUMMARY

We provide visibility packaging for energy storage elements including:
a. at least one blank composed of a sheet material, with formation of a rear wall and a front wall of the visibility packaging,
b. the front wall is spaced apart from the rear wall to form a receiving space for the energy storage elements,
c. the front wall is provided with at least one viewing cutout,
d. the front wall includes at least one web,
e. the web has a central apex region fixed to a contact region of the rear wall, wherein the web and the rear wall together form a K-shaped cross section in a closure position and the web close a removal opening of the receiving space, and
f. the rear wall has at least one perforation that delimits the contact region from a remainder of the rear wall and makes it possible to separate the contact region from the rear wall such that the web can be transferred by a folding operation into a removal position in which the apex region of the web is spaced apart from the rear wall and the web frees the removal opening of the receiving space.

We also provide a blank composed of a sheet material for production of the visibility packaging for energy storage elements including:
a. at least one blank composed of a sheet material, with formation of a rear wall and a front wall of the visibility packaging,
b. the front wall is spaced apart from the rear wall to form a receiving space for the energy storage elements,
c. the front wall is provided with at least one viewing cutout,
d. the front wall includes at least one web,
e. the web has a central apex region fixed to a contact region of the rear wall, wherein the web and the rear wall together form a K-shaped cross section in a closure position and the web close a removal opening of the receiving space, and
f. the rear wall has at least one perforation that delimits the contact region from a remainder of the rear wall and makes it possible to separate the contact region from the rear wall such that the web can be transferred by a folding operation into a removal position in which the apex region of the web is spaced apart from the rear wall and the web frees the removal opening of the receiving space.

DETAILED DESCRIPTION

Figure 1:
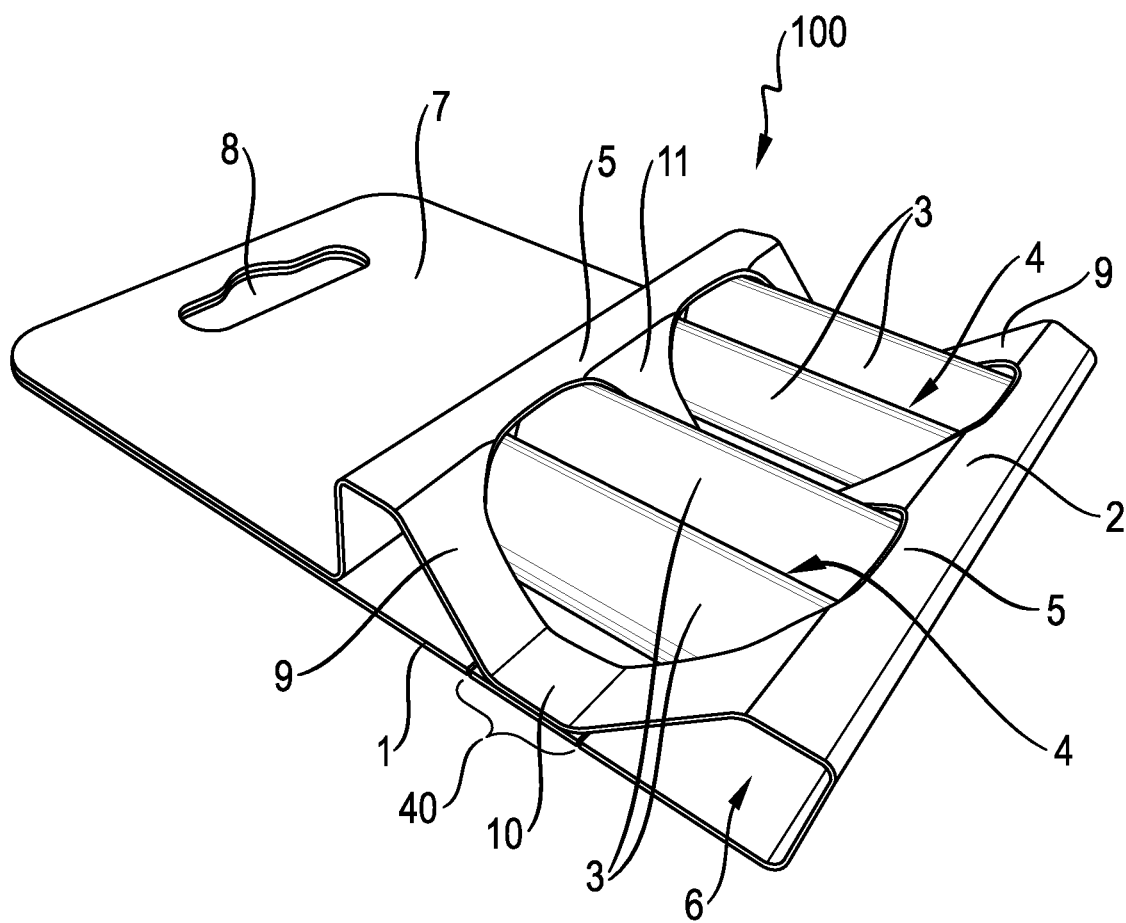
FIG. 1 shows an oblique view of a first example of a visibility packaging with four inserted energy storage elements.

Our visibility packaging for energy storage elements has the features a. to e. below:
- a. the visibility packaging is formed by at least one blank composed of a sheet material, with formation of a rear wall and a front wall of the visibility packaging;
- b. the front wall is spaced apart from the rear wall to form a receiving space for the energy storage elements;
- c. the front wall is provided with at least one viewing cutout;
- d. the front wall comprises at least one web; and
- e. the web has a central apex region fixed to a contact region of the rear wall, wherein the web and the rear wall together form a K-shaped cross section in a closure position and the web closes a removal opening of the receiving space.

Furthermore, the visibility packaging is characterized by feature f below:
- f. the rear wall has at least one perforation that delimits the contact region from the rest of the rear wall and makes it possible to separate the contact region from the rear wall such that the web can be transferred by way of a folding operation into a removal position in which the apex region of the web is spaced apart from the rear wall and the web frees the removal opening of the receiving space.

By the aforementioned features of the visibility packaging, a packaging for energy storage elements is provided wherein, in contrast to conventional packaging, it is not necessary to press the energy storage elements through the cardboard or tear open the packaging. Rather, the special configuration of the web or webs that, together with the rear wall, form a K-shaped cross section in the closure position facilitates a mechanism of which the packaging can be opened for removal of the energy storage elements and then closed again. For this purpose, the perforation in the rear wall of the packaging is separated during the first actuation. This releases the contact region of the web, and therefore the web can be raised and pulled out such that the K-shaped configuration is cancelled. In this example, the receiving space for the energy storage elements, which was previously closed by the K-shaped web, is opened such that one or more energy storage elements can be removed. The web can subsequently be folded back into the original, K-shaped form again in the manner of a snap-action fastener such that the receiving space is closed again.

The web, which, together with the rear wall, forms a K-shaped cross section in the closure position and which, after detachment of the perforation on the rear wall, can be folded such that the apex region of the web is spaced apart from the rear wall, can act like a bistable spring element. Preferably, in the closure position, the web is in a first stable state, and in the removal position, is in a second stable state. The web is preferably under tension between the two stable states.

The energy storage elements can be removed from and optionally also put back into the visibility packaging again. It is thus, for example, possible for an already discharged battery to be put back into the packaging in an inverted orientation ("upside down") and safe-ly stored in the re-closed pack until it can be disposed of properly. In addition to the environ-mental friendliness with regard to a later disposal of the packaging, the visibility packaging thus permits an expedient possibility for organizing new and used energy storage elements.

As a result of the at least one viewing cutout, the packaging also permits an attractive and sales-promoting presentation of the energy storage elements during their marketing.

It is preferable for the central apex region of the web, the apex region being fixed to the contact region of the rear wall, to constitute a middle region of the web that divides the web into two limbs. In the closure position, in which the web and the rear wall together form a K-shaped cross section, the limbs preferably form a V.

The central apex region can form a flat region fixed to the contact region of the rear wall. By way of example, this flat region can have approximately a square form, wherein the side lengths of this square region correspond approximately to the width of the web. This flat region can, for example, make up approximately a ⅓ or a ⅕ or less of the entire length of the web. For the fixing of this central apex region to the rear wall, an adhesive bond or an interlocking arrangement is, for example, suitable.

In other configurations, the central apex region can have a rectangular form, wherein two longitudinal sides of the apex region correspond to the width of the web and the two other longitudinal sides are shorter. In this configuration, the contact region can thus be substantially narrower than the square contact region described above. Fixing the apex region to the contact region can also be realized by way of an adhesive bond in this configuration. Particularly in this configuration, an interlocking arrangement can also be provided, which makes possible a linear contact region oriented in a longitudinal extent of the web transversely thereto.

The perforation can directly adjoin the contact region or else be arranged at a certain distance from the actual contact region in which the web is fixed to the rear wall. As a result of the contact region being removed by the user by the perforation, the contact region, together with the web fixed thereto, is released such that the web can be folded up and down in the manner described above to open the receiving space and to close it again.

For the stability of the snap-action fastener that can be obtained by the web, it is generally advantageous for the sheet material used for the packaging to have a certain stiffness. Particularly preferably, the visibility packaging is therefore characterized by the additional feature a. below:
- a. the sheet material is cardboard.

In particular, customary cardboard having, for example, a grammage of 100 to 1000 $g/m^2$ is suitable for this purpose. For example, a grammage of 400 to 500 $g/m^2$, for example, 400 $g/m^2$ or 425 $g/m^2$, is particularly suitable.

The thickness of the cardboard can preferably be 0.4 to 0.8 mm, in particular 0.5 to 0.6 mm, for example, 0.58 mm.

The bending stiffness of suitable cardboard material can, for example, be 50 to 100 mNm in the machine direction (MD). The bending stiffness transversely with respect to the running direction (CD) can, for example, be 10 to 50 mNm.

By way of example, a material having a grammage of 425 $g/m^2$ and a bending stiffness of 64.2 mNm (MD) and 32.4 mNm (CD) with a thickness of 0.58 mm is thus suitable. In another suitable example, the grammage is 400 $g/m^2$ with a bending stiffness of 83 mNm (MD) and 26 mNm (CD) and a thickness of 0.58 mm. Particularly preferably, recycled material can be used as cardboard material.

The visibility packaging is particularly preferably characterized by the additional feature a. below:
  a. the at least one web is a border-side web, wherein two border-side webs are preferably provided.

The border-side arrangement of the web or webs provides a border-side opening mechanism for the receiving space in the manner described above. It is particularly advantageous in this example for two border-side webs to be provided, which can open and close the receiving space in the manner described above such that the energy storage elements can be removed and/or put back on both sides. Depending on the use, it is also possible for the visibility packaging to be opened and possibly closed again only on one side.

In addition, it is also possible for at least one further web to be provided, which is located not at the borders but rather within the receiving space and thus makes it possible to divide the receiving space into a plurality of compartments. In particular, in such an example, provision can be made for a plurality of viewing cutouts to be provided in the front wall of the visibility packaging, the viewing cutouts making it possible to view individual energy storage elements or energy storage elements arranged in groups. The at least one further web, in particular the further webs, are in this example expediently formed by sheet portions between the individual viewing cutouts and are preferably fixed, like the border-side webs, to a contact region of the rear wall in each example by a central apex region and form, together with the rear wall, a K-shaped cross section. The at least one further web, in particular the further webs, thus divide the receiving space into individual chambers for receiving in each example at least one of the energy storage elements.

In some examples, it can be provided that, in a web that divides the receiving space, a perforation is also provided on the rear wall to be able to separate the contact regions of this web. In this example, it is thus also possible for a web which divides the receiving space to be moved by way of a folding operation in the manner of a snap-action fastener. This configuration can, for example, be particularly advantageous if the visibility packaging is provided for six or eight or possibly more energy storage elements that are preferably arranged in pair-wise fashion. However, provision can also be made for no perforation to be assigned to webs which divide the receiving space such that these webs cannot be moved in a destruction-free manner.

The perforation by which the contact region to which the apex region of the web is fastened can be separated from the rest of the rear wall of the visibility packaging, can be designed in a different manner. In particular, an approximately rectangular region can be separated from the rear wall by the perforation. With respect to the design of the perforation, it is in this example important that the region which can be separated by way of the perforation is that region to which the apex region of the web is fixed.

When a perforation is spoken of in the course of this application, this generally means a linear weakening of the rear wall. Along this weakening line, the rear wall is more sensitive to mechanical loads, in particular to compressive loads perpendicular to the surface of the rear wall and tensile loads parallel to the rear wall. The perforation preferably forms a predetermined separation point in the form of a frame, that delimits the contact region.

By way of example, the perforation can be formed by linear or punctiform punched-out portions or apertures or combinations of such lines and points. The perforation is intended to allow the user to easily separate the separable region and avoid unintentional damage to other regions of the rear wall.

Various geometries for the form of the perforation, that is to say for the frame formed by the perforation, can be selected, for example, also round or angled forms in addition to rectangular forms.

If the perforation(s) is(are) located in border-side regions of the rear wall, the region with the perforation can be delimited on one side by the border of the rear wall. The remaining three sides in the example of an approximately rectangular perforated portion are formed by the actual perforations.

Particularly preferably, the visibility packaging is characterized by the additional feature a. below:
  a. the perforation is assigned at least one cutout that adjoins the perforation, in particular a semicircular cutout or at least one border-side cutout.

The cutout can be configured in particular such that it permits engagement with a finger or a finger nail such that the perforation can thereby be manually detached in a particularly simple manner. This measure increases the user friendliness of the visibility packaging even further. If the perforation is provided, for example, for releasing a border-side web, provision can be made in the adjoining cutout for this cutout to lie at the border of the perforation, opposite the respective border of the packaging.

The cutout is thus preferably located opposite the border of the packaging to thus permit comfortable engagement for detaching the perforation for the user. In other configurations, the perforation can be extended by small border-side cutouts, for example, two cutouts that likewise make it even easier for the user to engage and detach the perforation from the side.

Particularly preferably, the visibility packaging is characterized by the additional feature a. below:
  a. the visibility packaging is formed from exactly one blank by folding along parallel lines and adhesive bonding.

Production of the visibility packaging from exactly one blank is very advantageous in terms of production technology since the production is thereby simplified. Preferably, it is advantageous for merely one part to be folded along corresponding parallel lines and subsequently adhesively bonded.

However, it is also entirely possible for the visibility packaging to be produced from, for example, two blanks. In these examples, further adhesive bonding steps or alternative fixing steps are generally required to produce the visibility packaging with the rear wall and the front wall and the receiving space formed thereby.

The visibility packaging is particularly preferably characterized by the additional feature a. below:
  a. the visibility packaging is designed for packaging energy storage elements in the form of cylindrical round cells.

Cylindrical round cells are very widely used as energy storage elements such that the very economical producibility of the visibility packaging and the environmentally friendly disposal possibilities thereof afford particular advantages for these mass-produced products. In principle, the visibility packaging is also suitable for other forms of energy storage elements, for example, for prism-shaped energy storage elements.

The visibility packaging can be adapted, by way of corresponding adaptation of the dimensions, to different forms and sizes of the energy storage elements to be packaged. The visibility packaging is particularly suitable for receiving cylindrical round cells in the widely used sizes AA or AAA. Energy storage elements with the standard AA size have a diameter of 13.5 mm to 14.5 mm and a height of 49.2 mm to 50.5 mm. Energy storage elements with the standard AAA size have a diameter of 9.5 mm to 10.5 mm and a height of 43.3 mm to 44.5 mm. However, the visibility packaging is not restricted to the packaging of such cylindrical round cells.

Particularly advantageously, the visibility packaging is characterized by the additional feature a. directly below:
  a. the visibility packaging is provided for the pair-wise arrangement of the energy storage elements, wherein a respective viewing cutout is assigned to a pair of energy storage elements.

This example is particularly advantageous since oftentimes pairs of energy storage elements are used for various applications. It thus often happens that two energy storage elements or possibly even four energy storage elements are required at the same time. It is therefore particularly advantageous if two or a pair of energy storage elements can simultaneously be removed from the visibility packaging or possibly put back again. In this configuration, provision is made for a respective viewing cutout to be assigned to a pair of energy storage elements.

In a packaging with more than two energy storage elements, that is to say, for example, with four energy storage elements, it is particularly advantageous if the pairs of energy storage elements are separated from one another by further webs in the interior of the receiving space. As already mentioned further above, these inner webs that likewise form a K-shaped cross section together with the rear wall, can be equipped with a perforation just like the border-side web or the border-side webs, and in preferred examples can also be actuated in the manner of a snap-action fastener.

However, provision can also be made for these inner webs to not be actuable in the manner of a snap-action fastener by dispensing with corresponding perforations. This configuration may, for example, be preferred if two pairs of energy storage elements are arranged in the visibility packaging. In this example, the pairs can each be removed via the foldable webs on the border side. The web which is located in the middle of the receiving space between the two pairs of energy storage elements is preferably designed to not be foldable since the energy storage elements are removed via the borders.

The visibility packaging is particularly preferably provided for the arrangement of two or of four energy storage elements. However, it is also entirely possible for the visibility packaging to be provided for packaging more than four energy storage elements. Furthermore, it is also possible for an uneven number of energy storage elements to be packaged with the visibility packaging.

The visibility packaging is preferably characterized by the additional feature a. below:
  a. the visibility packaging contains at least one energy storage element, preferably at least a pair of energy storage elements, particularly preferably one or two pairs of energy storage elements.

The energy storage element or the energy storage elements which is/are contained in the visibility packaging is/are particularly advantageously the mentioned cylindrical round cells, in particular in the AA or AAA size.

In this context, primary alkaline manganese cells are particularly preferred but it is fundamentally also possible for secondary cells, for example, lithium ion cells or nickel metal hydride cells, to be contained in the visibility packaging. Such energy storage elements are required for a very large number of applications, for example, household applications or other applications for daily needs. The visibility packaging is excellently suited for the presentation and packaging of these mass-produced articles.

Our packaging additionally comprises corresponding blanks composed of a sheet material, preferably cardboard blanks from which the visibility packaging described can be produced. With respect to further details of these blanks, reference is made to the statements above and to the subsequent description of examples in conjunction with the drawings.

Further features and advantages emerge from the subsequent description of examples in conjunction with the drawings. The individual features can each be implemented in isolation or in combination with one another.

FIG. 1 shows an oblique top view of a preferred example of a visibility packaging 100. The visibility packaging 100 is formed from a blank composed of a sheet material, in particular from a cardboard blank, by way of folds and adhesive bonds. The visibility packaging 100 comprises a rear wall 1 and a front wall 2 that together form a receiving space 6 in which the energy storage elements 3 that are arranged in pairs, in this example two pairs, are located. The energy storage elements 3 are cylindrical round cells.

The front wall has two viewing cutouts 4, through which the energy storage elements 3 are largely visible to the observer. Parts of the front wall form delimiting portions 5 for the energy storage elements 3 such that the energy storage elements 3 lie transversely in the receiving space 6. The receiving space 6 is designed such that the energy storage elements 3 lie with a parallel orientation of their longitudinal axes in the receiving space 6. The width of the receiving space 6 corresponds substantially to the length of the individual energy storage elements 3. Generally speaking, the length of the receiving space 6 is dependent on how many energy storage elements 3 (in this example four) are intended to be placed in the visibility packaging 100.

Located above the receiving space 6 is a free surface 7 of the visibility packaging 100. This surface 7 can be utilized for labels and other illustrations in particular for sales and presentation purposes. Furthermore, the visibility packaging 100 has, in the upper region, a punched-out portion or a cutout 8, by which the visibility packaging 100 can be hung on suitable stands for sales purposes.

In the two border-side regions of the visibility packaging, a respective web 9 is arranged in the region of the receiving space 6, the web forming, together with the rear wall 1, a K-shaped cross section in the closure position shown here. The central apex region 10 of the web 9 is fixed, and in particular adhesively bonded, to a contact region of the rear wall 1. The apex region 10 divides the web 9, as it were, into two limbs such that the apex region 10 and the limbs of the web have approximately a V-shaped cross section. This arrangement of the web 9 closes the receiving space 6 and prevents the energy storage elements 3 from slipping out such that the energy storage elements 3 are safely stored in the visibility packaging 100.

In this example, the visibility packaging 100 is formed from a one-part cardboard blank. In other configurations, a two-part blank can be used for the production of a comparable visibility packaging, as is illustrated on the basis of FIG. 2.

Figure 2:
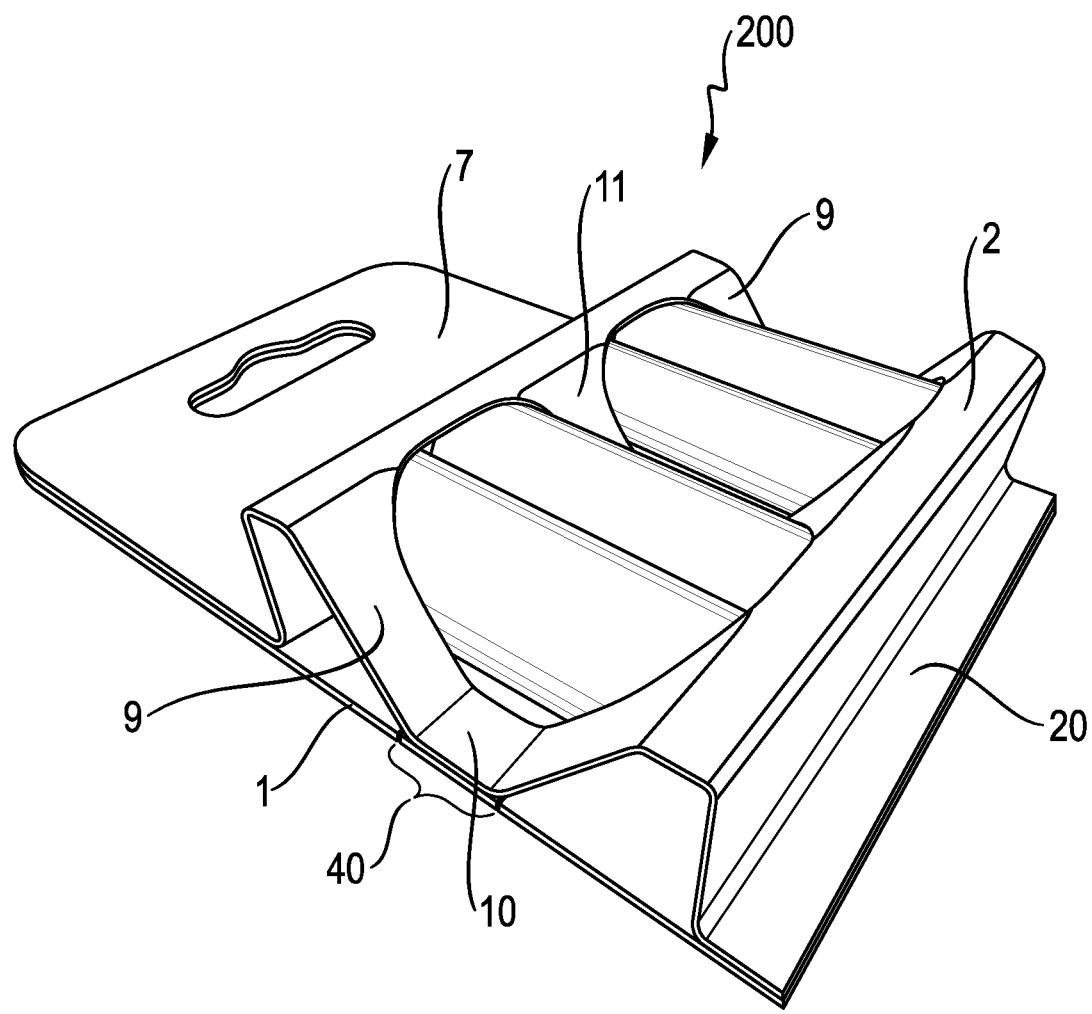
FIG. 2 shows an oblique view of a second example of a visibility packaging with four inserted energy storage elements.
Figure 3:
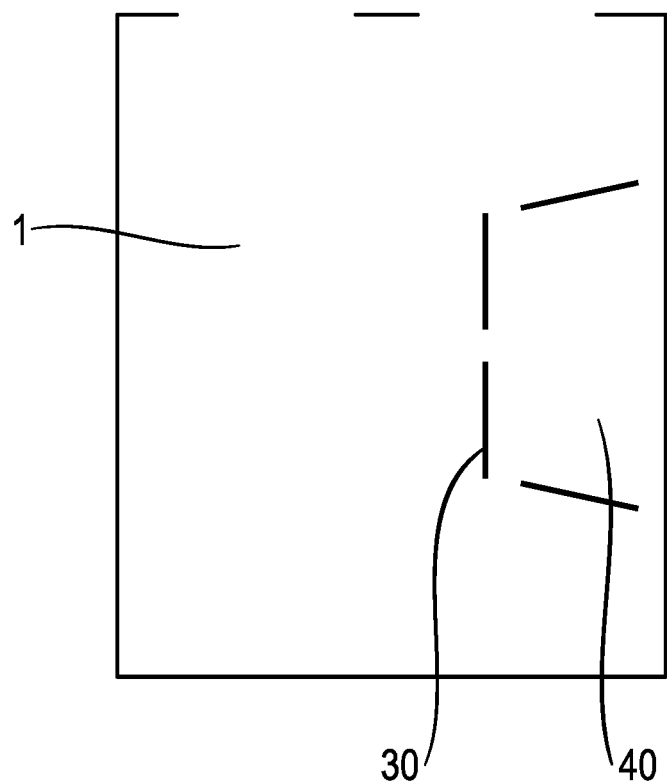
FIG. 3 shows an exemplary configuration of a perforation.
Figure 4:
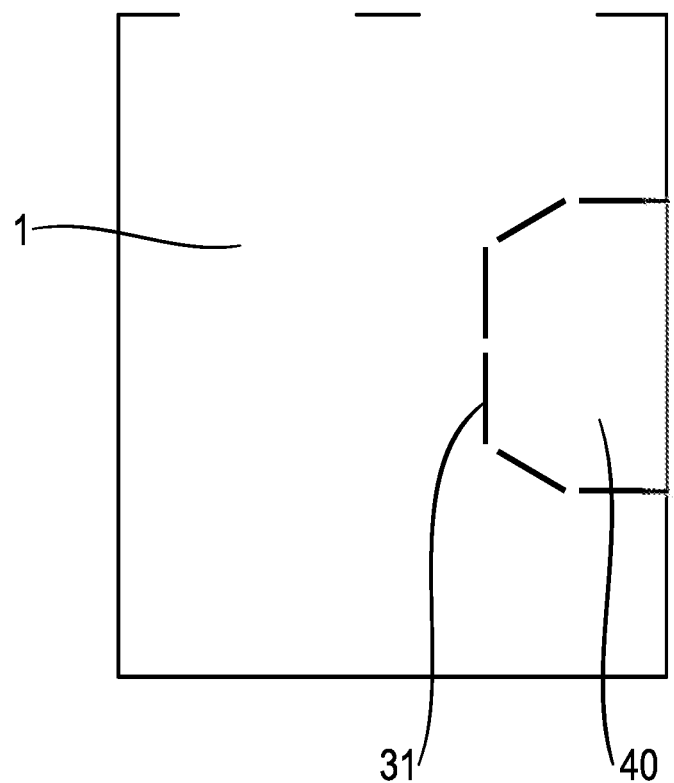
FIG. 4 shows a further example of a perforation.

The example of the visibility packaging 200 shown in FIG. 2 has a rear wall 1 and a front wall 2 in a comparable manner to the visibility packaging 100 from FIG. 1 and is also configured in relation to the rest of the elements in a comparable manner to the packaging 100. In contrast to the packaging 100, the front wall 2 is formed by a separate blank in the packaging 200, the blank being adhesively bonded to the corresponding blank for the rear wall 1 in the lower region 20 and in the region of the upper surface 7. Apart from that, the configuration of the packaging 200 of the visibility packaging shown in FIG. 2 corresponds to the packaging 100, and reference is made, with respect to the corresponding features, to the description relating to FIG. 1.

A central aspect of our packaging is that the apex region 10 together with the contact region 40 of the rear wall 1, to which contact region the apex region is fixed, can be separated from the rear wall 1 by a perforation. As a result, the web 9 is then fixedly anchored only at two points, namely at its two ends in the region of the delimiting portions 5 of the receiving space 6 such that the web 9 can be raised out of the closure position and folded upwards. As a result, the receiving space 6 is brought into an opened position such that one or more energy storage elements 3, for example, a pair of energy storage elements, can be removed. The web 9 can subsequently be brought back into the K-shaped closure position in the manner of a snap-action fastener to close the receiving space 6. The two border-side webs are preferably assigned such perforations such that the receiving space 6 can be opened and closed again on both sides.

In the packaging 100 and 200, a further web 11, which, in a comparable manner with the border-side webs 9, forms a K-shaped cross section together with the rear wall 1, is located approximately in the middle of the receiving space 6. It is possible for a perforation to also be assigned to the apex region of the web 11 such that the apex region of the web 11 can be detached from the rest of the rear wall and thus the web 11 can be actuated in the manner of a snap-action fastener. In other configurations, however, provision can also be made for no perforation to be assigned to the web 11 such that the web 11 forms, as it were, a permanent division of the receiving space 6. Particularly in examples in which the visibility packaging has more than two compartments which are each separated from one another by webs 11, it may be expedient for the webs 11 which further divide the receiving space 6 to also be provided with a perforation for separation of the respective apex region to be able to also open and close these webs 11.

The particular advantage of the visibility packaging is thus that the visibility packaging can be closed again after one or more energy storage elements have been removed or put back. Both in the closure position and in the removal position there is no projection of packaging material, and a situation where packaging material could unintentionally fall off also does not occur. The visibility packaging is particularly preferably configured for the pair-wise removal of energy storage elements, as in the examples shown here. The visibility packaging is in this example particularly suited for packaging two or four energy storage elements, for example, in the AA or AAA sizes.

FIGS. 3 to 6 show various examples of the perforations by which the respective contact region 40, to which the central apex region 10 of the web 9 is fixed, can be detached from the rest of the rear wall 1. In the illustrations shown here, the rear wall 1 is shown from the rear side of the visibility packaging. The perforations shown are assigned to border-side webs. The perforations 30, 31, 32, 33 in this example delimit the respective contact region 40 from the rest of the rear wall 1. Each right-hand side, shown in these illustrations, of the contact region 40 which can be separated by the perforation 30, 31, 32 or 33 is formed by the open edge or by the border of the visibility packaging. The remaining sides, in particular the remaining three sides of the approximately rectangular contact region 40, are formed by the perforations 30, 31, 32, 33 that are linear in these examples. Various geometries are possible, for example, a geometry with chamfered corners as in the examples 31 and 33.

Figure 5:
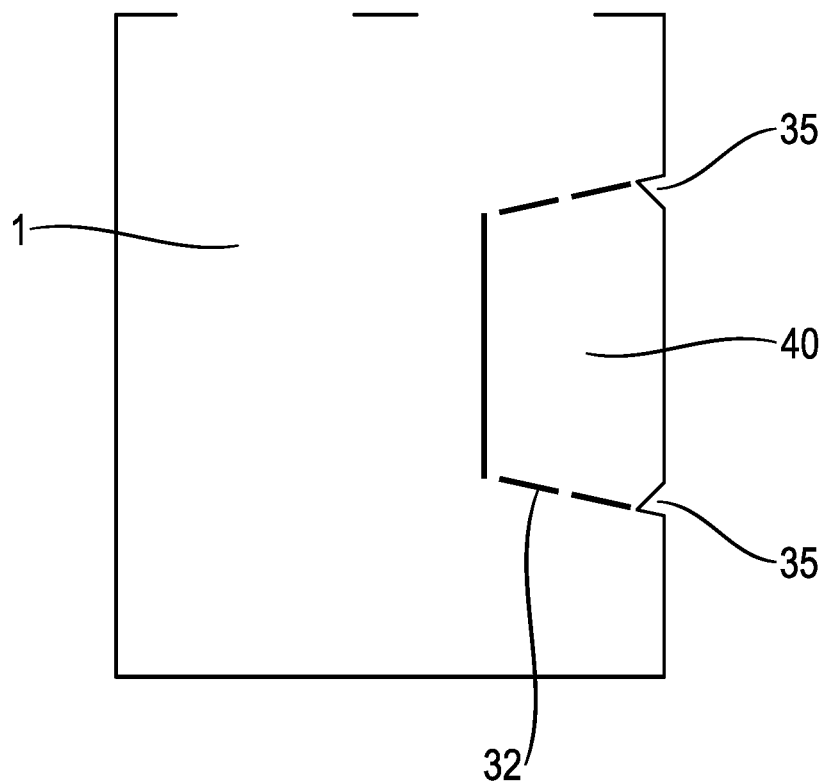
FIG. 5 shows a further example of a perforation.

A particularly preferred configuration of the perforation 32 is shown in FIG. 5, wherein here two triangular cutouts 35 are provided in the border-side regions of the perforation 32, the triangular cutouts making manual engagement easier for a user.

Figure 6:
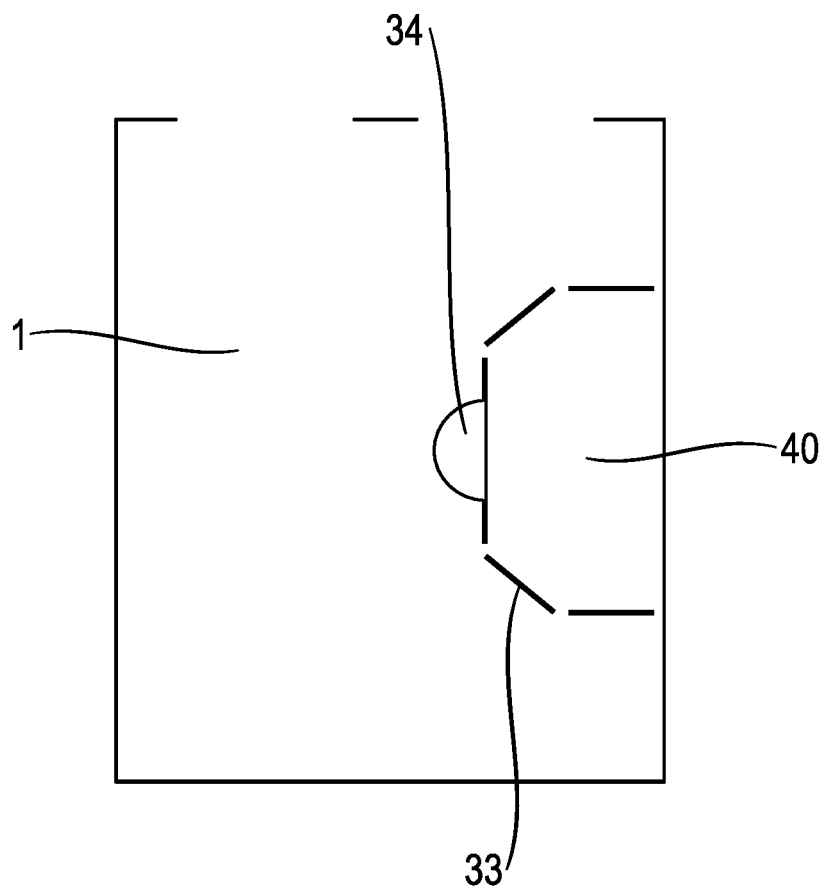
FIG. 6 shows a further example of a perforation.

In this example, FIG. 6 shows a further particularly preferred configuration of the perforation 33, wherein, in this configuration, a semicircular cutout 34 which adjoins the perforation 33 is provided, the semicircular cutout being used to make it even easier for the user to detach or separate the perforation 33.

Figure 7:
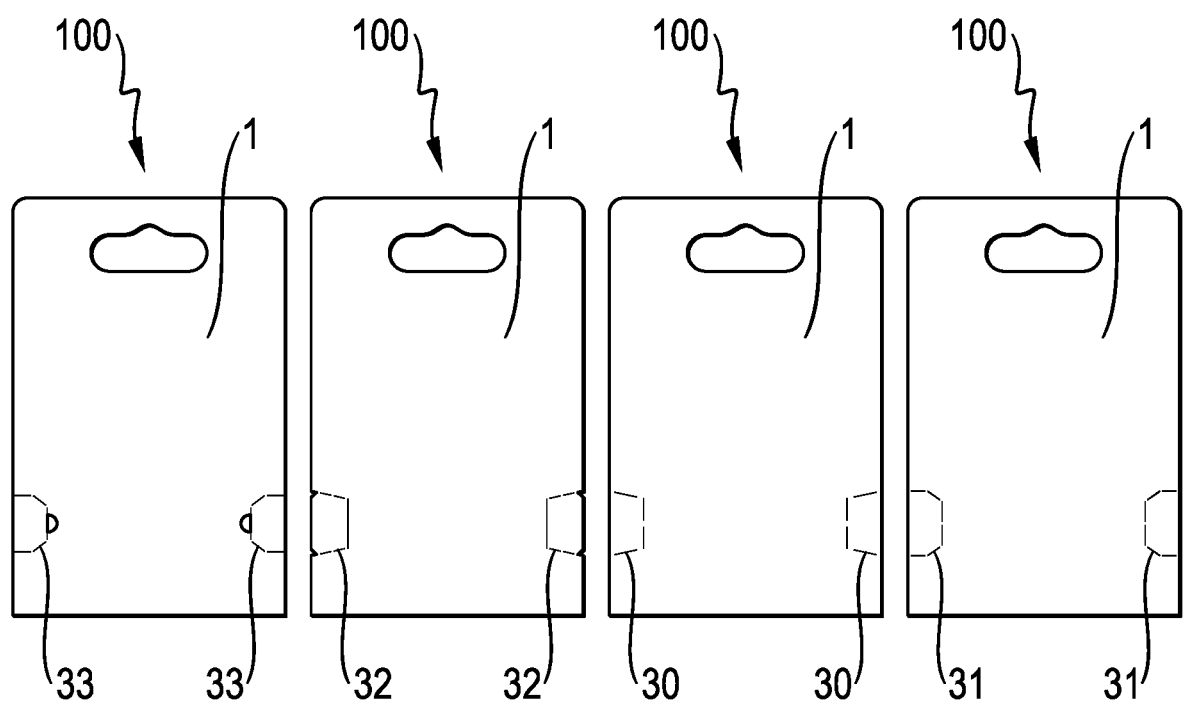
FIG. 7 shows four exemplary configurations of the rear wall or rear side of a visibility packaging, each with two border-side perforations.

FIG. 7 shows the complete rear view of the rear walls 1 of the visibility packaging 100 for illustration of the arrangement of the respective perforations 30, 31, 32 or 33. The respective perforations 30, 31, 32 and 33 are each located at the border of the rear walls 1 and are in this example assigned to the border-side webs (not visible in any more detail here) of the visibility packaging 100. By these perforations, a user can open and re-close the border-side webs of the visibility packaging 100 in a simple manner in the manner described to be able to remove energy storage elements or else possibly put them back again.

Figure 8:
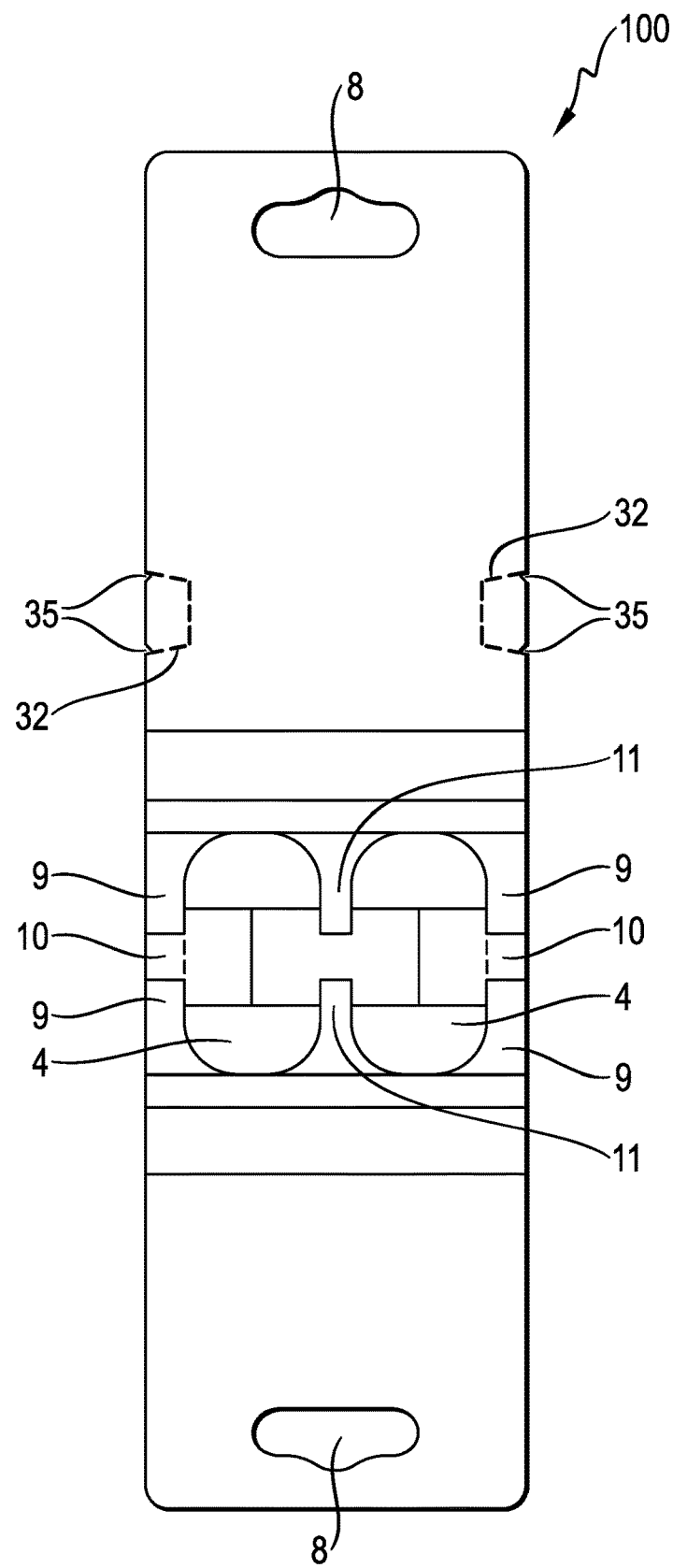
FIG. 8 shows a exemplary blank for the production of a visibility packaging.
Figure 9:
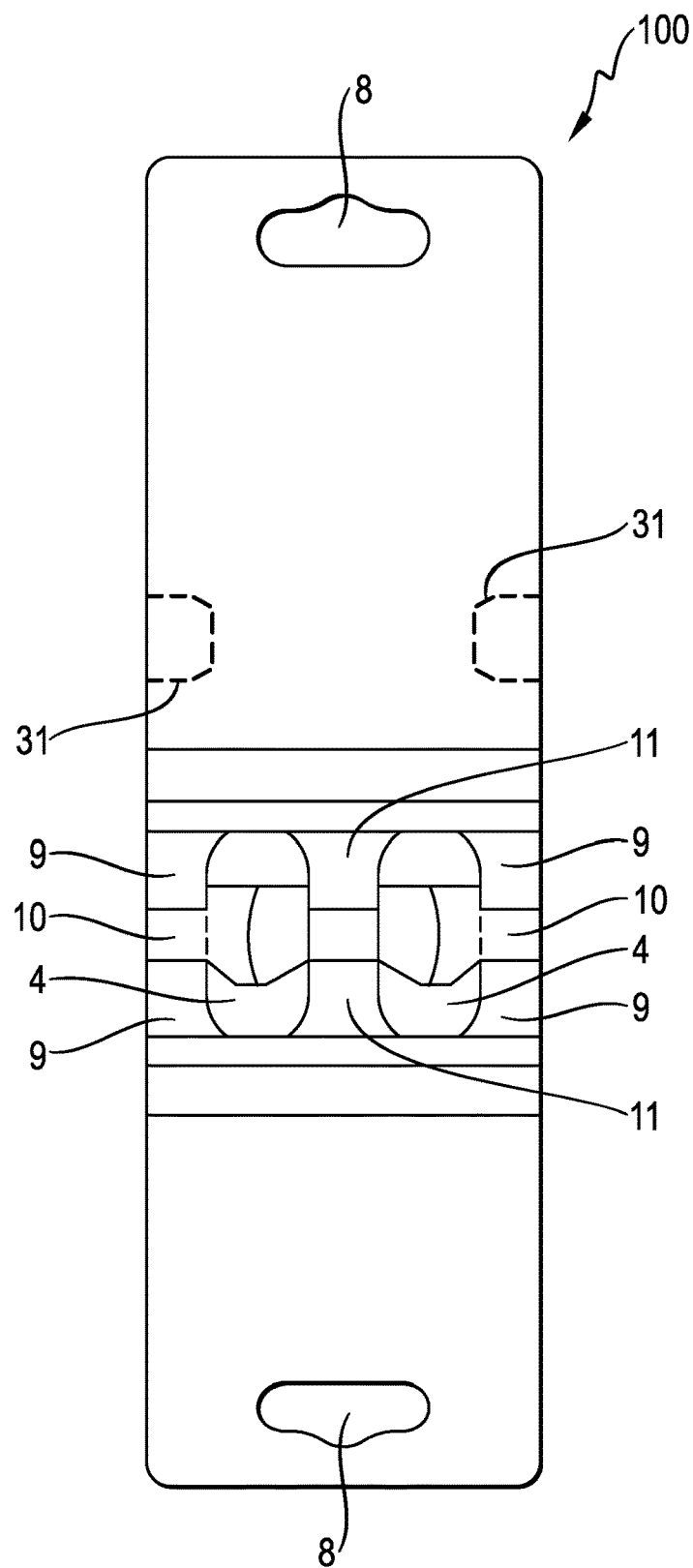
FIG. 9 shows a further exemplary blank for the production of a visibility packaging.

FIGS. 8 and 9 illustrate exemplary cutting patterns for one-part blanks composed of a sheet material, for example, composed of cardboard, which, by way of folds along the illustrated lines and corresponding adhesive bonds, are provided for production of a visibility packaging 100. By way of example, a material having a grammage of 425 g/m$^2$ and a bending stiffness of 64.2 mNm (MD) and 32.4 mNm (CD) with a thickness of 0.58 mm (GD 425 g/m$^2$) is suitable as sheet material. In another suitable example, the grammage is 400 g/m$^2$ with a bending stiffness of 83.0 mNm (MD) and 26.0 mNm (CD) and a thickness of 0.58 mm (GT4 Kraft cardboard 400 g/m$^2$).

FIG. 8 shows a one-part blank for a visibility packaging 100, in which border-side perforations 32 are provided with the already explained border-side cutouts 35. This blank can, for example, be used for a packaging for four cylindrical round cells in the AA size, which are arranged in the form of two pairs.

FIG. 9 shows a one-part blank for a visibility packaging 100, in which border-side perforations 31 are provided with angled corners. The three-dimensional configuration of the visibility packaging 100 is achieved by folding along the parallel lines and corresponding adhesive bonds. In this way, a receiving space 6 for the energy storage elements, in particular for cylindrical round cells, is produced, wherein the energy storage elements then lie in the region of the viewing cutouts 4. This blank can, for example, be used for a packaging for four cylindrical round cells in the AAA size that are arranged in the form of two pairs. In the folded and adhesively bonded state, the cutouts 8 each lie on top of each other and form the hanging opening for the visibility packaging 100. Depending on the size and number of the energy storage elements to be packaged, the dimensions of the blanks can be correspondingly adapted.

The invention claimed is:

1. Visibility packaging for energy storage elements comprising:
   a) at least one blank composed of a sheet material, the sheet material forming a rear wall and a front wall of the visibility packaging,
   b) the front wall is spaced apart from the rear wall to form a receiving space for the energy storage elements,
   c) the front wall is provided with at least one viewing cutout,
   d) the front wall comprises at least one web,
   e) the at least one web has a central apex region fixed to a contact region of the rear wall, wherein the at least one web and the rear wall together form a K-shaped cross section in a closure position and the at least one web closes a removal opening of the receiving space, and
   f) the rear wall has at least one perforation that delimits the contact region from a remainder of the rear wall, and
   wherein the contact region is separable from the rear wall along the at least one perforation such that the at least one web is transferable by a folding operation into a removal position in which the apex region of the at least one web is spaced apart from the rear wall and the at least one web frees the removal opening of the receiving space.

2. The visibility packaging according to claim 1, wherein the sheet material is cardboard.

3. The visibility packaging according to claim 1, wherein the at least one web is a border-side web, and two border-side webs are preferably provided.

4. The visibility packaging according to claim 1, wherein the perforation is assigned at least one cutout, a semicircular cutout or at least one border side cutout that adjoins the perforation.

5. The visibility packaging according to claim 1, wherein the at least one blank of the visibility packaging is one part folded along parallel lines and adhesive bonding.

6. The visibility packaging according to claim 1, wherein the visibility packaging is designed for packaging energy storage elements in the form of cylindrical round cells.

7. The visibility packaging according to claim 1, wherein the visibility packaging is designed for pair-wise arrangement of the energy storage elements, and a respective viewing cutout is assigned to a pair of energy storage elements.

8. The visibility packaging according to claim 1, wherein the visibility packaging is designed for arrangement of two or of four energy storage elements.

9. The visibility packaging according to claim 1, wherein the visibility packaging contains at least one energy storage element or at least a pair of energy storage elements or one or two pairs of energy storage elements.

10. The blank composed of a sheet material for production of the visibility packaging according to claim 1.

* * * * *